US012656497B2

(12) United States Patent
Wang

(10) Patent No.: US 12,656,497 B2
(45) Date of Patent: Jun. 16, 2026

(54) POINT CLOUD MOTION COMPENSATION METHOD AND APPARATUS, STORAGE MEDIUM, AND LIDAR

(71) Applicant: SUTENG INNOVATION TECHNOLOGY CO., LTD., Shenzhen (CN)

(72) Inventor: Bin Wang, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 872 days.

(21) Appl. No.: 17/983,352

(22) Filed: Nov. 8, 2022

(65) Prior Publication Data

US 2023/0141421 A1 May 11, 2023

(30) Foreign Application Priority Data

Nov. 9, 2021 (CN) .......................... 202111324223.X

(51) Int. Cl.
| | |
|---|---|
| *G01S 17/89* | (2020.01) |
| *G01S 7/40* | (2006.01) |
(Continued)

(52) U.S. Cl.
CPC ................ *G01S 17/89* (2013.01); *G01S 7/40* (2013.01); *G01S 7/497* (2013.01); *G01S 13/865* (2013.01); *G01S 13/89* (2013.01)

(58) Field of Classification Search
None
See application file for complete search history.

(56) References Cited

U.S. PATENT DOCUMENTS

2018/0367871 A1* 12/2018 Zeng ..................... G01S 13/931

FOREIGN PATENT DOCUMENTS

| CN | 110888120 A | 3/2020 |
|---|---|---|
| CN | 112184906 A | 1/2021 |

OTHER PUBLICATIONS

Kim, Taek-Lim, Jae-Seol Lee, and Tae-Hyoung Park. "Fusing lidar, radar, and camera using extended Kalman filter for estimating the forward position of vehicles." 2019 IEEE International Conference on Cybernetics and Intelligent Systems (CIS) and IEEE Conference on Robotics. (Year: 2019).*

(Continued)

*Primary Examiner* — Luke D Ratcliffe
(74) *Attorney, Agent, or Firm* — BAYES PLLC

(57) ABSTRACT

This application discloses a point cloud motion compensation method and apparatus, a storage medium, and a LiDAR. The method includes: obtaining a millimeter-wave point cloud data frame by a millimeter-wave radar through scanning a preset working region, where each millimeter-wave point cloud data frame includes multiple pieces of millimeter-wave point cloud data, and each piece of millimeter-wave point cloud data includes a timestamp and a motion parameter of a target object; obtaining a LiDAR point cloud data frame by the LiDAR through scanning a preset working region, where each LiDAR point cloud data frame includes multiple pieces of LiDAR point cloud data, and each piece of LiDAR point cloud data includes a timestamp and spatial position coordinates of the target object; fusing the millimeter-wave point cloud data with the LiDAR point cloud data; and performing attitude compensation on the LiDAR point cloud data based on the fused data.

8 Claims, 11 Drawing Sheets

(51) Int. Cl.
    *G01S 7/497*     (2006.01)
    *G01S 13/86*     (2006.01)
    *G01S 13/89*     (2006.01)

(56)                References Cited

OTHER PUBLICATIONS

First Office Action issued in related Chinese Application No. 202111324223.X, mailed May 22, 2024, 17 pages.
"Distortion compensation of laser point cloud" posted on CSDN Blog dated Feb. 17, 2021, 25 pages. https://blog.csdn.net/neil3611244/article/details/113837654.

\* cited by examiner

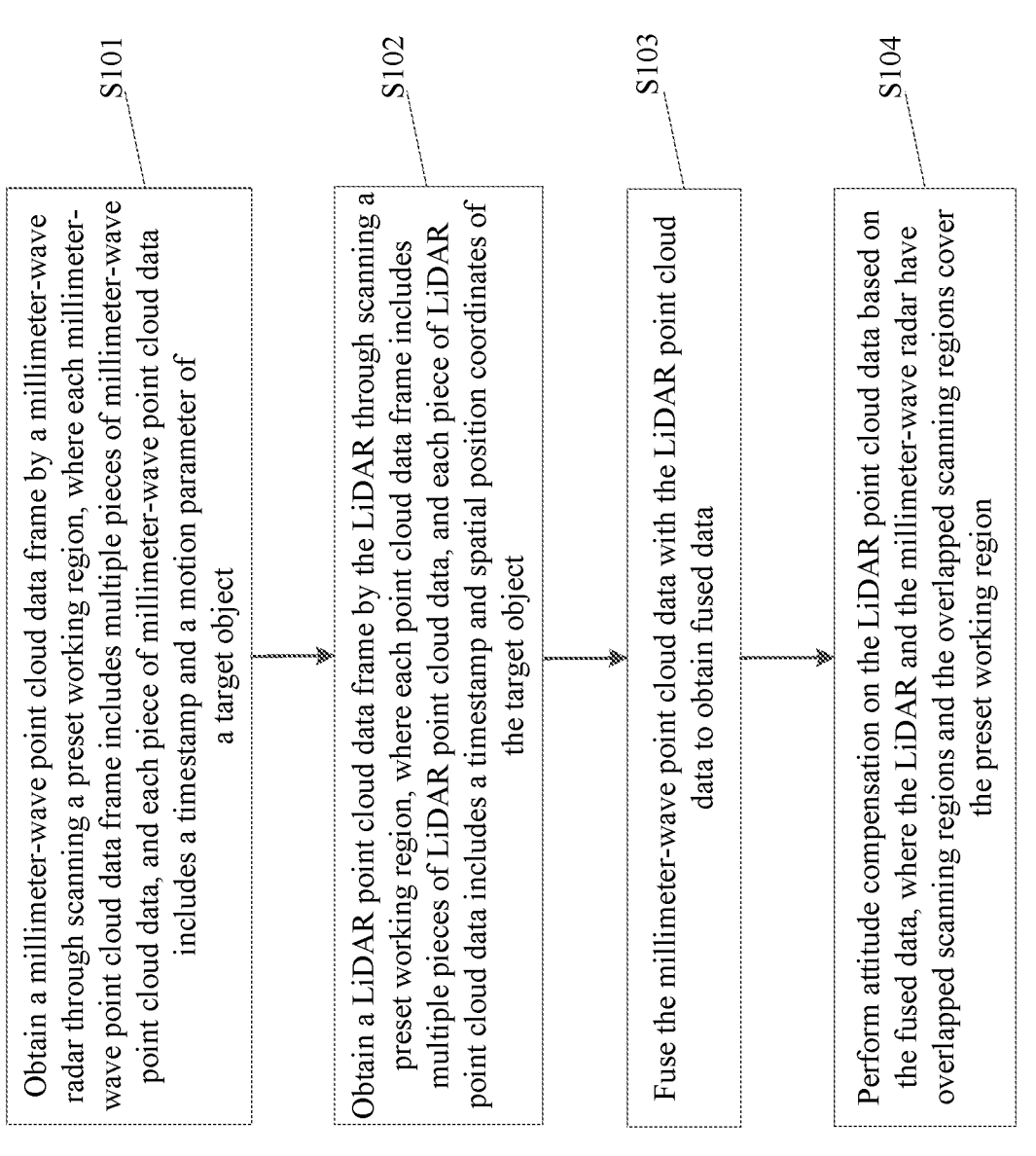

S101

Obtain a millimeter-wave point cloud data frame by a millimeter-wave radar through scanning a preset working region, where each millimeter-wave point cloud data frame includes multiple pieces of millimeter-wave point cloud data, and each piece of millimeter-wave point cloud data includes a timestamp and a motion parameter of a target object

S102

Obtain a LiDAR point cloud data frame by the LiDAR through scanning a preset working region, where each point cloud data frame includes multiple pieces of LiDAR point cloud data, and each piece of LiDAR point cloud data includes a timestamp and spatial position coordinates of the target object

S103

Fuse the millimeter-wave point cloud data with the LiDAR point cloud data to obtain fused data

S104

Perform attitude compensation on the LiDAR point cloud data based on the fused data, where the LiDAR and the millimeter-wave radar have overlapped scanning regions and the overlapped scanning regions cover the preset working region

FIG. 1

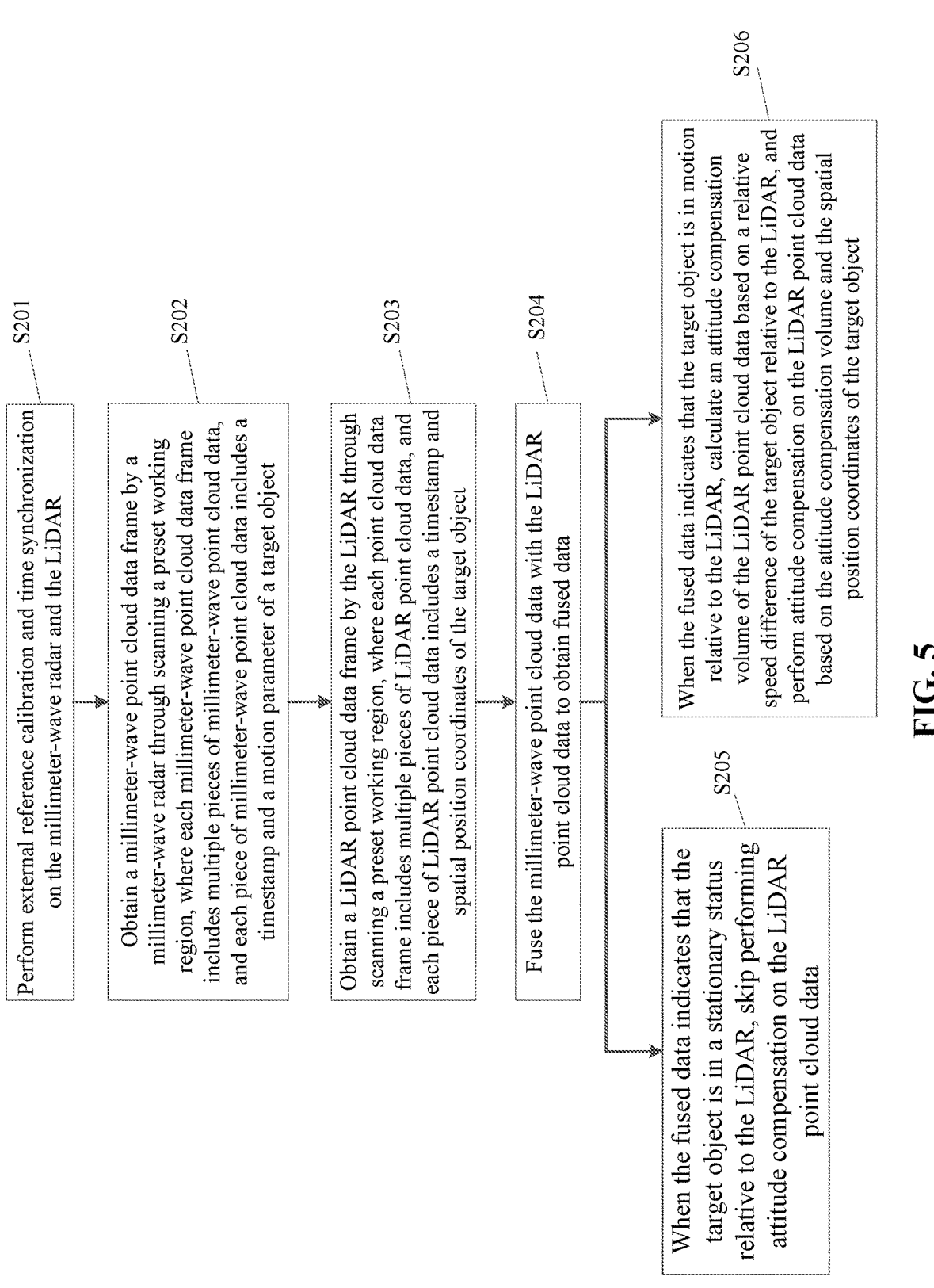

Perform external reference calibration and time synchronization on the millimeter-wave radar and the LiDAR — S201

Obtain a millimeter-wave point cloud data frame by a millimeter-wave radar through scanning a preset working region, where each millimeter-wave point cloud data frame includes multiple pieces of millimeter-wave point cloud data, and each piece of millimeter-wave point cloud data includes a timestamp and a motion parameter of a target object — S202

Obtain a LiDAR point cloud data frame by the LiDAR through scanning a preset working region, where each point cloud data frame includes multiple pieces of LiDAR point cloud data, and each piece of LiDAR point cloud data includes a timestamp and spatial position coordinates of the target object — S203

Fuse the millimeter-wave point cloud data with the LiDAR point cloud data to obtain fused data — S204

When the fused data indicates that the target object is in a stationary status relative to the LiDAR, skip performing attitude compensation on the LiDAR point cloud data — S205

When the fused data indicates that the target object is in motion relative to the LiDAR, calculate an attitude compensation volume of the LiDAR point cloud data based on a relative speed difference of the target object relative to the LiDAR, and perform attitude compensation on the LiDAR point cloud data based on the attitude compensation volume and the spatial position coordinates of the target object — S206

FIG. 5

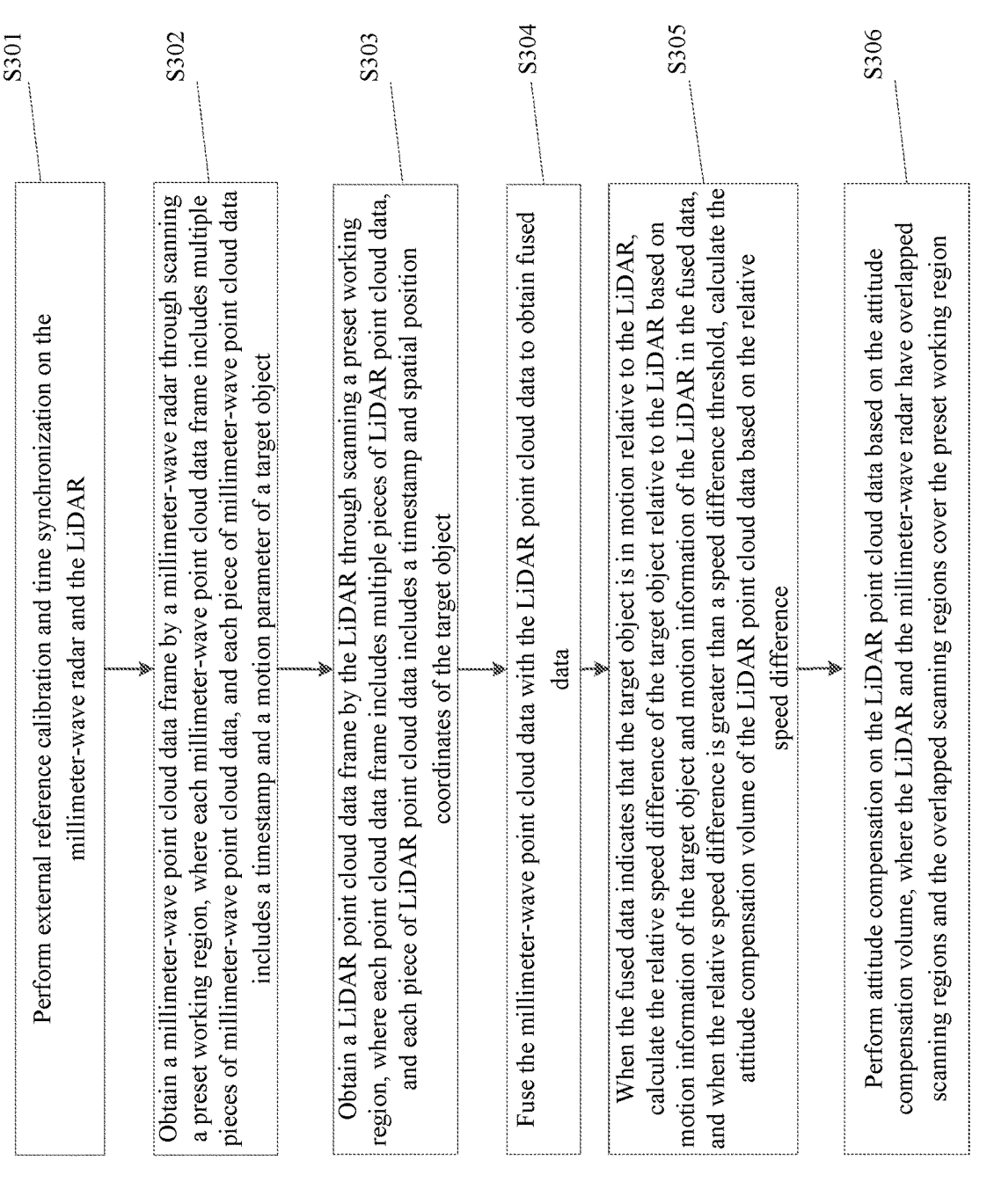

Perform external reference calibration and time synchronization on the millimeter-wave radar and the LiDAR

S302

Obtain a millimeter-wave point cloud data frame by a millimeter-wave radar through scanning a preset working region, where each millimeter-wave point cloud data frame includes multiple pieces of millimeter-wave point cloud data, and each piece of millimeter-wave point cloud data includes a timestamp and a motion parameter of a target object

S303

Obtain a LiDAR point cloud data frame by the LiDAR through scanning a preset working region, where each point cloud data frame includes multiple pieces of LiDAR point cloud data, and each piece of LiDAR point cloud data includes a timestamp and spatial position coordinates of the target object

S304

Fuse the millimeter-wave point cloud data with the LiDAR point cloud data to obtain fused data

S305

When the fused data indicates that the target object is in motion relative to the LiDAR, calculate the relative speed difference of the target object relative to the LiDAR based on motion information of the target object and motion information of the LiDAR in the fused data, and when the relative speed difference is greater than a speed difference threshold, calculate the attitude compensation volume of the LiDAR point cloud data based on the relative speed difference

S306

Perform attitude compensation on the LiDAR point cloud data based on the attitude compensation volume, where the LiDAR and the millimeter-wave radar have overlapped scanning regions and the overlapped scanning regions cover the preset working region

1

11 — First data obtaining module

12 — Second data obtaining module

13 — Data fusion module

14 — Attitude compensation module

Point cloud motion compensation apparatus

1

POINT CLOUD MOTION COMPENSATION METHOD AND APPARATUS, STORAGE MEDIUM, AND LIDAR

CROSS-REFERENCE TO RELATED APPLICATION

The present application claims the benefit of priority to China Patent Application No. 202111324223.X, filed on Nov. 9, 2021, the content of which is incorporated herein by reference in its entirety.

TECHNICAL FIELD

This application relates to the field of computer technologies, and in particular, to a point cloud motion compensation method and apparatus, a storage medium, and a LiDAR.

BACKGROUND

LiDARs are widely used in the field of autonomous driving. A LiDAR can rapidly set up a three-dimensional model for a periphery of a vehicle through laser scanning, to provide basic data for highly precise map manufacture, obstacle recognition, and precise vehicle positioning, to sense a driving environment of the vehicle. When a supporting platform provided for the LiDAR is in motion, a three-dimensional model set up for a surrounding environment by using only a collected laser point cloud is distorted and cannot truly reflect the surrounding environment of the LiDAR at a specific moment.

SUMMARY

Embodiments of this application provide a point cloud motion compensation method and apparatus, a storage medium, and a LiDAR, to perform attitude compensation on distortion and correct motion distortion. A technical solution is as follows:

According to a first aspect, an embodiment of this application provides a point cloud motion compensation method, where the method includes:

obtaining a millimeter-wave point cloud data frame by a millimeter-wave radar through scanning a preset working region, where each millimeter-wave point cloud data frame includes multiple pieces of millimeter-wave point cloud data, and each piece of millimeter-wave point cloud data includes a timestamp and a motion parameter of a target object;

obtaining a LiDAR point cloud data frame by the LiDAR through scanning a preset working region, where each point cloud data frame includes multiple pieces of LiDAR point cloud data, and each piece of LiDAR point cloud data includes a timestamp and spatial position coordinates of the target object;

fusing the millimeter-wave point cloud data with the LiDAR point cloud data to obtain fused data; and performing attitude compensation on the LiDAR point cloud data based on the fused data, where the LiDAR and the millimeter-wave radar have overlapped scanning regions and the overlapped scanning regions cover the preset working region.

According to a second aspect, an embodiment of this application provides a point cloud motion compensation apparatus, where the apparatus includes:

a first data obtaining module, configured to obtain a millimeter-wave point cloud data frame by a millimeter-wave radar through scanning a preset working region, where each millimeter-wave point cloud data frame includes multiple pieces of millimeter-wave point cloud data, and each piece of millimeter-wave point cloud data includes a timestamp and a motion parameter of a target object;

a second data obtaining module, configured to obtain a LiDAR point cloud data frame by the LiDAR through scanning a preset working region, where each point cloud data frame includes multiple pieces of LiDAR point cloud data, and each piece of LiDAR point cloud data includes a timestamp and spatial position coordinates of the target object;

a data fusion module, configured to fuse the millimeter-wave point cloud data with the LiDAR point cloud data to obtain fused data; and an attitude compensation module, configured to perform attitude compensation on the LiDAR point cloud data based on the fused data, where the LiDAR and the millimeter-wave radar have overlapped scanning regions and the overlapped scanning regions cover the preset working region.

According to a third aspect, an embodiment of this application provides a computer storage medium, where the computer storage medium stores a plurality of instructions, and the instructions are capable of being loaded by a processor to perform the steps of the forgoing method.

According to a fourth aspect, an embodiment of this application provides a LiDAR, including a processor and a memory, where the memory stores a computer program, and the computer program is capable of being loaded by the processor to perform the steps of the forgoing method.

The beneficial effects provided by the technical solutions of some embodiments of the present application include at least:

multiple pieces of motion parameter data are obtained by the millimeter-wave radar by scanning the preset working region; the motion parameter data includes a timestamp and a motion parameter of the target object; the LiDAR point cloud data frame is obtained by the LiDAR through scanning the preset working region, where each point cloud data frame includes the multiple pieces of LiDAR point cloud data, and each piece of LiDAR point cloud data includes the timestamp and the spatial position coordinates of the target object; the millimeter-wave point cloud data is fused with the LiDAR point cloud data to obtain the fused data; and attitude compensation is performed on the LiDAR point cloud data based on the fused data, where the LiDAR and the millimeter-wave radar have the overlapped scanning regions and the overlapped scanning regions cover the preset working region. When there is a motion distortion in the LiDAR point cloud data obtained by the LiDAR through scanning, attitude compensation can be performed on the LiDAR point cloud data that needs compensation, to obtain corrected LiDAR point cloud data, which improves accuracy and correct rate of LiDAR detection.

BRIEF DESCRIPTION OF DRAWINGS

To explain embodiments of the present application or the technical solutions in the prior art more clearly, the following briefly introduces the drawings used in the embodiments or the prior art. Obviously, the drawings in the following description are only some embodiments of the present application. The person skilled in the art may obtain other drawings based on these drawings without inventive labor.

FIG. 1 is a schematic flowchart of a point cloud motion compensation method according to an embodiment of this application;

FIG. 5 is a schematic flowchart of a point cloud motion compensation method according to an embodiment of this application;

FIG. 6 is a schematic flowchart of a point cloud motion compensation method according to an embodiment of this application;

DETAILED DESCRIPTION

Figure 2:
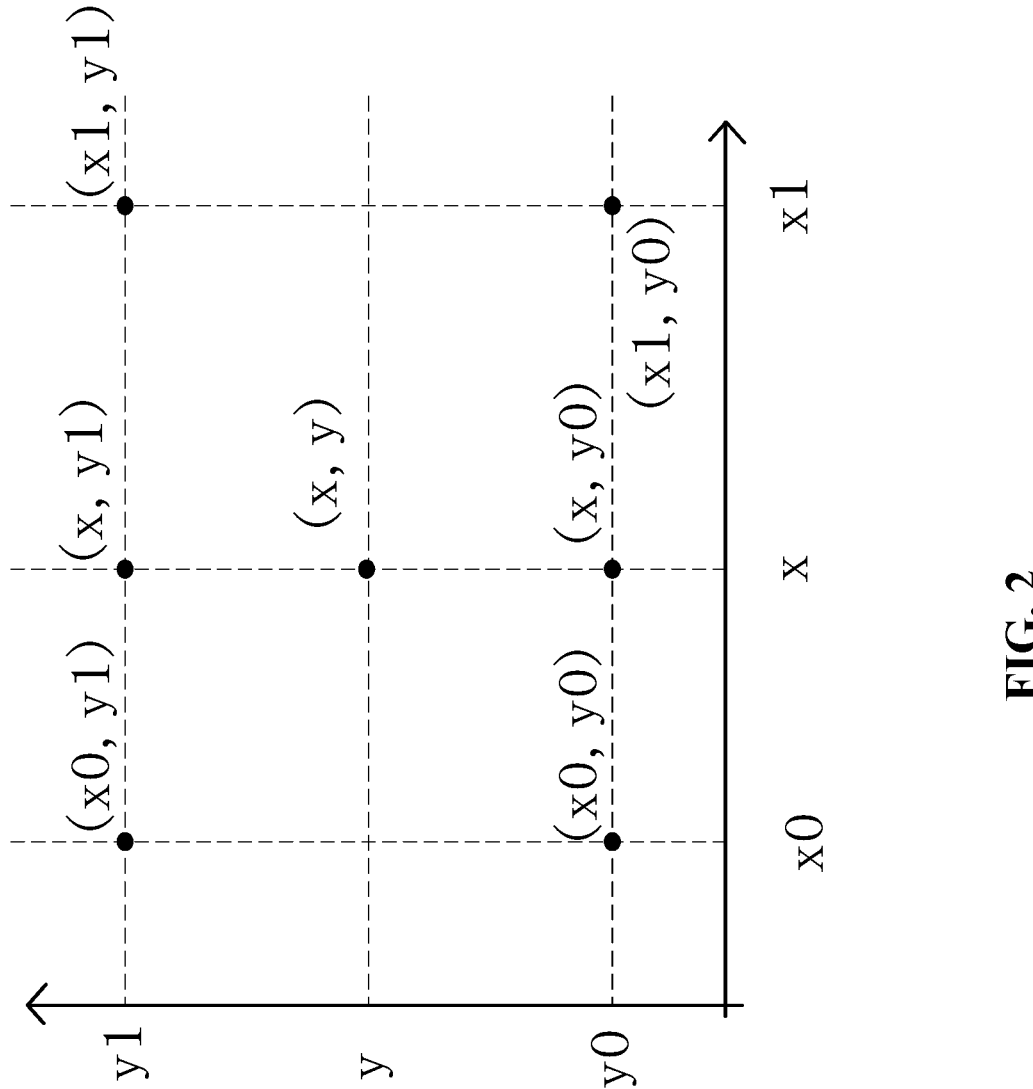
FIG. 2 is a schematic diagram of coordinates using a bilinear interpolation method according to an embodiment of this application.

To make objectives, technical solutions, and advantages of the present application clearer, embodiments of the present application are described in further detail below with reference to the drawings.

When the following description refers to the drawings, unless otherwise indicated, the same numbers in different drawings indicate the same or similar elements. The implementations described in the following exemplary embodiments do not represent all implementations consistent with the present application. On the contrary, the implementations are merely examples of devices and methods consistent with some aspects of the present application as detailed in the appended claims.

In the description of the present application, it shall be understood that the terms such as "first" and "second" are merely intended for a purpose of description, and shall not be understood as an indication or implication of relative importance. The person skilled in the art can understand specific meanings of the foregoing terms in the present application to a specific situation. In addition, in the descriptions of this application, "a plurality of" means two or more unless otherwise specified. Herein, "and/or" is an association relationship for describing associated objects and indicates that three relationships may exist. For example, A and/or B may mean the following three cases: Only A exists, both A and B exist, and only B exists. The character "/" indicates an "or" relationship between the associated objects.

This application is described in detail below with reference to embodiments.

The point cloud motion compensation method provided in this application is described in detail below with reference to FIG. 1 to FIG. 11. The method may be implemented by a computer program, which can run on a point cloud motion compensation apparatus based on the Von Neumann architecture. The computer program can be integrated into an application or run as an independent tool application. The point cloud motion compensation apparatus in this application may be any device using the point cloud motion compensation method. The device includes but is not limited to a vehicle-mounted device, an airplane, a train, a handheld device, a wearable device, a computing device, or another processing device connected to a wireless modem.

A LiDAR is more accurate than a millimeter-wave radar in ranging and identification of an obstacle, but the millimeter-wave radar has a better speed detection capability than the LiDAR. Therefore, in this solution, the millimeter-wave radar is used to obtain a motion status of the LiDAR relative to a nearby object, and based on the relative motion status, obtained by the millimeter-wave radar, of the LiDAR relative to the nearby object, it is determined whether attitude compensation is to be performed.

Refer to FIG. 1, which is a schematic flowchart of a point cloud motion compensation method according to an embodiment of this application.

As shown in FIG. 1, the method may include the following steps:

S101. Obtain a millimeter-wave point cloud data frame by a millimeter-wave radar through scanning a preset working region, where each millimeter-wave point cloud data frame includes multiple pieces of millimeter-wave point cloud data, and each piece of millimeter-wave point cloud data includes a timestamp and a motion parameter of a target object.

The millimeter-wave radar is a detection radar working on a millimeter-wave band. Generally, the frequency domain of the millimeter-wave band is 30 GHz to 300 GHz (wavelength is 1 mm to 10 mm).

The target object refers to an object other than the LiDAR that is detected by the millimeter-wave radar through scanning based on a scanning range of the millimeter-wave radar. The target object can be an object adjacent to the millimeter-wave radar, or can be an object that is far away but is within the scanning range of the millimeter-wave radar. There may be any type and any number of objects, which are not limited herein.

Motion parameters of the target object include an instantaneous speed of the target object and an azimuth angle of the target object.

The motion parameters of the LiDAR represent motion features of the LiDAR, and the motion parameters include one or more of angular speed, linear speed, linear acceleration, and angular acceleration. In this application, the motion parameters of the LiDAR can be obtained through a measurement unit. The measurement unit is an apparatus for measuring three-axis attitude angles or acceleration of an object, and the measurement unit generally includes three single-axis accelerometers and three single-axis gyroscopes. The accelerometer is configured to measure the linear acceleration or linear speed of the object, and the gyroscope is configured to measure the angular speed or angular acceleration of the object. In this embodiment, the measurement unit uses a gyroscope to measure the motion parameters of the LiDAR and record a timestamp of the motion parameters, and the angular speed can be expressed in radians per second or degrees per second. The measurement unit may measure motion parameter data periodically or aperiodically. It should be understood that the motion parameter measured by the measurement unit may be a motion parameter on any one or more of the three axes. For example, when a supporting platform is a vehicle that mainly travels along a road and the LiDAR is set on the vehicle, the angular speed change caused by the turning of the vehicle is also a motion parameter on a horizontal plane measured by the measurement unit based on the horizontal plane or other planes (e.g. a plane perpendicular to the horizontal plane). Herein, the measurement unit may be an inertial measurement unit. Herein, it can be understood that the measurement unit may be integrated inside the LiDAR, or may be integrated on the supporting platform of the LiDAR, and the LiDAR is communicatively connected to a supporting platform terminal.

S102. Obtain a LiDAR point cloud data frame by the LiDAR through scanning a preset working region, where each point cloud data frame includes multiple pieces of LiDAR point cloud data, and each piece of LiDAR point cloud data includes a timestamp and spatial position coordinates of the target object.

The LiDAR obtains an echo signal, processes the echo signal to obtain echo data, and uses the echo data for point cloud output to obtain a point cloud data frame, where each point cloud data frame includes multiple pieces of LiDAR point cloud data.

The preset working region refers to a preset scanning region of the LiDAR during working and can be set based on a threshold of the working region of the LiDAR.

The LiDAR and the millimeter-wave radar can be provided on the vehicle. When the vehicle travels, a linear speed can be changed and an angular speed is also changed based on the horizontal plane when the vehicle takes a turning. In this case, the relative motion statuses of the LiDAR and the target object are also changed, and therefore, attitude compensation is performed continuously and dynamically on the LiDAR point cloud data obtained by the LiDAR.

S103. Fuse the millimeter-wave point cloud data with the LiDAR point cloud data to obtain fused data.

Fusion may be implemented by using a nearest neighbor search algorithm or a linear interpolation method.

The nearest neighbor search, also referred to as "closest point search," can be used to solve an optimization problem of finding the nearest point in scale space. The linear interpolation may be any one of nearest neighbor interpolation, bilinear interpolation, or bicubic interpolation. Take bilinear interpolation as an example. It is known that bilinear interpolation is the generalization of linear interpolation performed for a total of three times in two directions. A hyperbolic paraboloid is defined to fit four known points. An exemplary operation is to perform linear interpolation calculation twice in the direction X, and then perform interpolation calculation once in the direction Y.

As shown in FIG. 2, f(x, y) is a binary function, and it is assumed that values of four points of f(x0, y0), f(x1, y1), f(x0, y1), and f(x1, y0) are known. The four points determine a rectangle, and a function value of any point in the rectangle is obtained through interpolation.

Linear interpolation is first performed twice in the direction X, and a result is as follows:

$$f(x, y0) = \frac{x1 - x}{x1 - x0} f(x0, y0) + \frac{x1 - x}{x1 - x0} f(x1, y0)$$

-continued
$$f(x, y1) = \frac{x1 - x}{x1 - x0} f(x0, y1) + \frac{x - x1}{x1 - x0} f(x1, y1)$$

Linear interpolation is further performed once in the direction Y, and a result is as follows:

$$f(x, y) = \frac{y1 - y}{y1 - y0} f(x, y0) + \frac{y - y0}{y1 - y0} f(x, y1)$$

By integrating the foregoing results, a result of bilinear interpolation is obtained:

$$f(x, y) = \frac{(y1 - y)(x1 - x)}{(y1 - y0)(x1 - x0)} f(x0, y0) + \frac{(y1 - y)(x - x0)}{(y1 - y0)(x1 - x0)} f(x1, y0) + $$
$$\frac{(y - y0)(x1 - x)}{(y1 - y0)(x1 - x0)} f(x0, y1) + \frac{(y - y0)(x - x0)}{(y1 - y0)(x1 - x0)}$$

If a coordinate system is selected and it is assumed that as for f(x), known coordinates of the four points are (0, 0), (0, 1), (1, 0), and (1, 1), and therefore, a unit square is determined, and the four points are separately four vertices of the square.

First, linear interpolation is performed on two upper vertices, and a result is as follows:

$$f(x, 0) = f(0, 0) + x[f(1, 0) - f(0, 0)]$$

Then, linear interpolation is performed on two lower vertices, and a result is as follows:

$$f(x, 1) = f(0, 1) + x[f(1, 1) - f(0, 1)]$$

Finally, linear interpolation is performed in the vertical direction, to determine a formula:

$$f(x, y) = f(x, 0) + y[f(x, 1) - f(x, 0)]$$

The foregoing formulas are summarized to obtain a simplified interpolation formula:

$$f(x, y) = x[f(1, 0) - f(0, 0)] + y[f(0, 1) - f(x, 0)] + $$
$$f(0, 0) + xy[f(1, 1) - f(0, 0) - f(0, 1) - f(1, 0)]$$

In addition, the nearest neighbor search algorithm may be used to calculate a transformation matrix between the millimeter-wave point cloud data and the point cloud data obtained by the LiDAR. The transformation matrix represents a position difference between the millimeter-wave point cloud data and the point cloud data obtained by the LiDAR. Based on the transformation matrix, a coordinate deviation degree of the two types of data can be learned, thus obtain the fused data.

S104. Perform attitude compensation on the LiDAR point cloud data based on the fused data, where the LiDAR and the millimeter-wave radar have overlapped scanning regions and the overlapped scanning regions cover the preset working region.

Before performing attitude compensation on the LiDAR point cloud data based on the fused data, the method further includes: clustering the fused data; and determining a motion status of the target object relative to the LiDAR based on clustered fused data.

Figure 3:
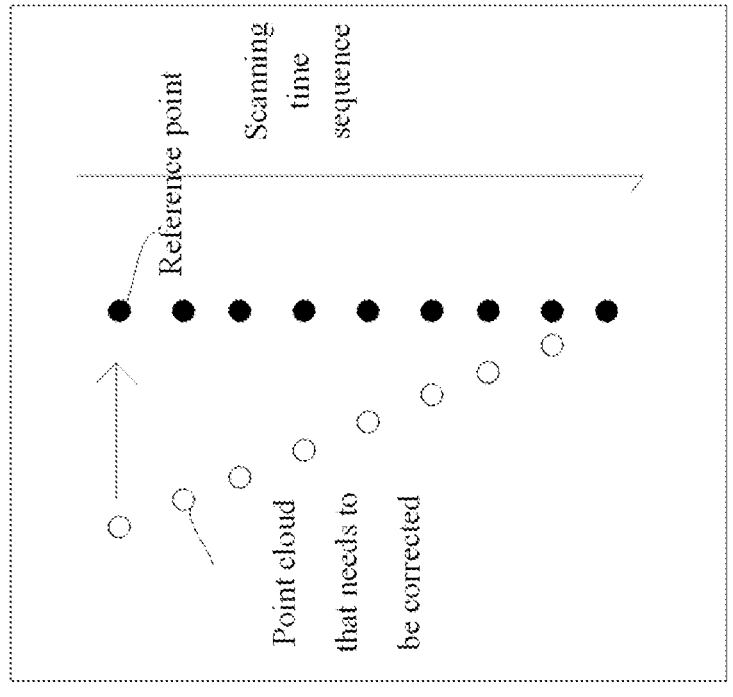
FIG. 3 is a schematic diagram of an example of a point cloud data frame according to an embodiment of this application.

The LiDAR point cloud data includes multiple columns of point clouds. Taking one column as an example, as shown in FIG. 3, using the first point cloud in a scanning time sequence as a reference point, perform attitude compensation on the LiDAR point cloud data that needs to be corrected at the same time, so that the LiDAR point cloud data is translated to the position of the reference point and overlapped with the reference point, thereby completing correction of the point cloud. Then, the corrected point cloud is used as the reference point to correct a point cloud that needs attitude compensation at a next timestamp, until attitude compensation of the column of point clouds is completed, to obtain a column of corrected point clouds. Attitude compensation is further performed on the next column of point clouds based on the time sequence.

It should be noted that the motion compensation is to compensate for a radar attitude at a specific time by using a radar point cloud, and is a relative motion relationship. An attitude of any rigid body in space under a specific reference coordinate system can be represented by translation t and rotation R, and is usually expressed as a homogeneous transformation relationship for ease of description:

$$T1 = \begin{bmatrix} R1 & t1 \\ 0 & 1 \end{bmatrix}$$

In addition, usually, a relative relationship between two attitudes can be expressed through homogeneous transformation:

$$T12 = (T1).\text{inverse}() \times T2 = \begin{bmatrix} R1.\text{inverse}() \times R2 & R1.\text{inverse}() \times (t2 - t1) \\ 0 & 1 \end{bmatrix}$$

Herein, T1 and T2 represent two attitudes in a reference coordinate system, T12 represents conversion from the second attitude to the first attitude, inverse ( ) represents an inverse operation of the matrix, and a rotation matrix R satisfies that the inversion operation is equal to a transpose operation transpose ( ):

$$R.\text{ inverse }() = R.\text{ transpose }()$$

Figure 4:
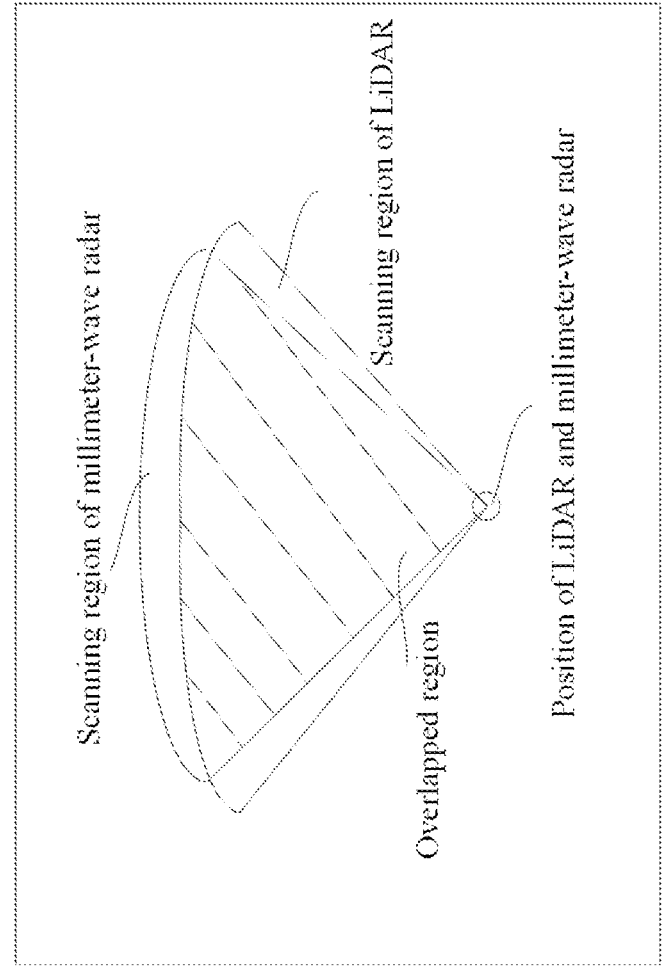
FIG. 4 is a schematic diagram of an example of a scanning region of a millimeter-wave radar and a LiDAR according to an embodiment of this application.

Herein, an overlapped scanning region of the LiDAR and the millimeter-wave radar is shown in FIG. 4.

In this embodiment, the millimeter-wave point cloud data frame is obtained by the millimeter-wave radar by scanning the preset working region. Each millimeter-wave point cloud data frame includes multiple pieces of millimeter-wave point cloud data, and each piece of millimeter-wave point cloud data includes a timestamp and a motion parameter of the target object. The LiDAR point cloud data frame is obtained by the LiDAR through scanning the preset working region. Each point cloud data frame includes the multiple pieces of LiDAR point cloud data, and each piece of LiDAR point cloud data includes the timestamp and the spatial position coordinates of the target object. The millimeter-wave point cloud data is fused with the LiDAR point cloud data to obtain the fused data; and attitude compensation is performed on the LiDAR point cloud data based on the fused data, where the LiDAR and the millimeter-wave radar have the overlapped scanning regions and the overlapped scanning regions cover the preset working region. When there is a motion distortion in the LiDAR point cloud data obtained by the LiDAR through scanning, attitude compensation can be performed on the LiDAR point cloud data that needs compensation, to obtain corrected LiDAR point cloud data, which improves accuracy and correct rate of LiDAR detection.

Refer to FIG. 5, which is a schematic flowchart of a LiDAR detection method according to an embodiment of this application. As shown in FIG. 5, the LiDAR detection method may include the following steps.

S201. Perform external reference calibration and time synchronization on the millimeter-wave radar and the LiDAR.

External reference calibration of the millimeter-wave radar and the LiDAR refers to calculation of a relative transformation relationship between a coordinate system corresponding to the LiDAR and a coordinate system corresponding to the millimeter-wave radar. The relative transformation relationship includes translation and rotation relationships between the coordinate system corresponding to the millimeter-wave radar and the coordinate system corresponding to the LiDAR. The timestamp represents time when the point cloud data corresponding to the millimeter-wave radar or the LiDAR is generated, and therefore, time synchronization can be performed on the two radars by using a timestamp in the multiple pieces of motion parameter data obtained by the millimeter-wave radar through scanning and a timestamp of the LiDAR point cloud data in the point cloud data frame obtained by the LiDAR.

S202. Obtain a millimeter-wave point cloud data frame by a millimeter-wave radar through scanning a preset working region. Each millimeter-wave point cloud data frame includes multiple pieces of millimeter-wave point cloud data, and each piece of millimeter-wave point cloud data includes a timestamp and a motion parameter of a target object.

For details, refer to S101, which are not described herein again.

S203. Obtain a LiDAR point cloud data frame by the LiDAR through scanning a preset working region. Each point cloud data frame includes multiple pieces of LiDAR point cloud data, and each piece of LiDAR point cloud data includes a timestamp and spatial position coordinates of the target object.

For details, refer to S102, which are not described herein again.

S204. Fuse the millimeter-wave point cloud data with the LiDAR point cloud data to obtain fused data.

For details, refer to S103, which are not described herein again.

S205. When the fused data indicates that the target object is in a stationary status relative to the LiDAR, skip performing attitude compensation on the LiDAR point cloud data.

When the fused data indicates that the target object is in a stationary status relative to the LiDAR, before skipping performing attitude compensation on the LiDAR point cloud data, the method further includes:

clustering the fused data; and determining a motion status of the target object relative to the LiDAR based on clustered fused data.

Determining a motion status of the target object relative to the LiDAR based on clustered fused data includes: obtaining motion parameter information of the radar by using a measurement unit, where the motion parameter includes one or more of angular speed, linear speed, linear acceleration, and angular acceleration; and obtaining the motion status of the target object relative to the LiDAR based on motion parameter information of the target object and motion parameter information of the LiDAR in the fused data.

When motion parameters of the target object and the LiDAR are kept consistent, or a difference between each type of motion parameters is less than a preset value, it is determined that the target object is stationary relative to the LiDAR, and when a motion status of the target object relative to the LiDAR is stationary, there is basically no motion distortion or the motion distortion can be ignored, and therefore, attitude compensation is not performed on the LiDAR point cloud data.

For example, when the target object and the LiDAR move at the same speed under the same road condition, it can be determined that the target object and the LiDAR are stationary relative to one another. When speeds of the milli-meter-wave radar and the LiDAR are both zero in a specific direction, it may be determined that the target object and the LiDAR are stationary relative to one another.

S206. When the fused data indicates that the target object is in motion relative to the LiDAR, calculate an attitude compensation volume of the LiDAR point cloud data based on a relative speed difference of the target object relative to the LiDAR, and perform attitude compensation on the LiDAR point cloud data based on the attitude compensation volume and the spatial position coordinates of the target object.

When the LiDAR is working, there are three possible motion statuses of the target object relative to the LiDAR. When a movement direction of the target object is the same as a movement direction of the LiDAR, and a movement speed of the target object is faster than that of the LiDAR, a distance between the target object and the LiDAR con-tinuously increases; or when the movement direction of the target object and the movement direction of the LiDAR are opposite, or are the same but a speed of the target object is slower than the speed of the LiDAR, the target object moves toward the LiDAR.

When the motion status of the target object relative to the LiDAR is a non-stationary status, attitude compensation needs to be performed on the LiDAR point cloud data.

When the fused data indicates that the target object is in a stationary status relative to the LiDAR, attitude compen-sation is not performed on the LiDAR point cloud data.

When the motion status of the target object relative to the LiDAR is a non-stationary status, attitude compensation needs to be performed on the LiDAR point cloud data obtained by the LiDAR, which includes:

determining motion parameter information of the target object based on the fused data;

obtaining the motion parameter information of the LiDAR by using the millimeter-wave radar;

obtaining a difference between motion parameters of the LiDAR and the target object;

calculating the relative speed difference of the target object relative to the LiDAR based on motion information of the target object and motion information of the LiDAR in the fused data; and when the relative speed difference is greater than a speed difference threshold, calculating the attitude compensation volume of the LiDAR point cloud data based on the relative speed difference.

In some embodiments, external reference calibration and time synchronization are performed on the millimeter-wave radar and the LiDAR, so that the relative transformation relationship between the coordinate system corresponding to the LiDAR and the coordinate system corresponding to the millimeter-wave radar can be obtained, thereby facilitating subsequent data fusion. The millimeter-wave point cloud data frame is obtained by the millimeter-wave radar by scanning the preset working region. Each millimeter-wave point cloud data frame includes multiple pieces of millime-ter-wave point cloud data, and each piece of millimeter-wave point cloud data includes a timestamp and a motion parameter of the target object. The LiDAR point cloud data frame is obtained by the LiDAR through scanning the preset working region, where each point cloud data frame includes the multiple pieces of LiDAR point cloud data, and each piece of LiDAR point cloud data includes the timestamp and the spatial position coordinates of the target object. The millimeter-wave point cloud data is fused with the LiDAR point cloud data to obtain the fused data. The fused data includes the instantaneous speed and azimuth angle infor-mation of the target object. Based on the instantaneous speed of the target object and speed information of a carrier of the radar, it is determined whether the target object is in motion relative to the radar. When the fused data indicates that the target object is in a stationary status relative to the LiDAR, attitude compensation is not performed on the LiDAR point cloud data. When motion compensation is not required, the attitude is not corrected, thereby reducing calculation com-plexity of point cloud correction. When the fused data indicates that the target object is in motion relative to the LiDAR, an attitude compensation volume of the LiDAR point cloud data is calculated based on a relative speed difference of the target object relative to the LiDAR, and attitude compensation is performed on the LiDAR point cloud data based on the attitude compensation volume and the spatial position coordinates of the target object. When there is a motion distortion in the LiDAR point cloud data obtained by the LiDAR through scanning, attitude compen-sation can be performed on the point cloud data that needs compensation, to obtain corrected LiDAR point cloud data, which improves accuracy and a correct rate of LiDAR detection results.

Refer to FIG. 6, which is a schematic flowchart of a LiDAR detection method according to an embodiment of this application. As shown in FIG. 6, the LiDAR detection method may include the following steps.

S301. Perform external reference calibration and time synchronization on the millimeter-wave radar and the LiDAR.

For details, refer to S201, which are not described herein again.

S302. Obtain a millimeter-wave point cloud data frame by a millimeter-wave radar through scanning a preset working region, where each millimeter-wave point cloud data frame includes multiple pieces of millimeter-wave point cloud data, and each piece of millimeter-wave point cloud data includes a timestamp and a motion parameter of a target object.

For details, refer to S101, which are not described herein again.

S303. Obtain a LiDAR point cloud data frame by the LiDAR through scanning a preset working region, where each point cloud data frame includes multiple pieces of LiDAR point cloud data, and each piece of LiDAR point cloud data includes a timestamp and spatial position coordinates of the target object.

For details, refer to S102, which are not described herein again.

S304. Fuse the millimeter-wave point cloud data with the LiDAR point cloud data to obtain fused data.

For details, refer to S103, which are not described herein again.

S305. When the fused data indicates that the target object is in motion relative to the LiDAR, calculate the relative speed difference of the target object relative to the LiDAR based on motion information of the target object and motion information of the LiDAR in the fused data, and when the relative speed difference is greater than a speed difference threshold, calculate the attitude compensation volume of the LiDAR point cloud data based on the relative speed difference.

The relative speed difference includes a relative speed difference in a horizontal direction and a relative speed difference in a vertical direction, and the method includes:

calculating a horizontal attitude compensation volume of the LiDAR point cloud data based on the relative speed difference of the target object relative to the LiDAR in the horizontal direction; and calculating a vertical attitude compensation volume of the LiDAR point cloud data based on the relative speed difference of the target object relative to the LiDAR in the vertical direction.

In some embodiments, the relative speed difference includes a relative angular speed difference and a relative linear speed difference;

when the relative angular speed difference is less than or equal to an angular speed threshold and a current linear speed difference is greater than a linear speed threshold, the attitude compensation volume is a linear speed attitude compensation volume;

when a current relative angular speed difference is greater than an angular speed threshold and a current relative linear speed difference is less than or equal to a linear speed threshold, the attitude compensation volume is an angular speed attitude compensation volume; or when a current relative angular speed difference is less than or equal to an angular speed threshold and a current linear speed difference is less than or equal to a linear speed threshold, attitude compensation is not performed.

The relative angular speed difference of the target object relative to the LiDAR is calculated based on motion information of the target object and motion information of the LiDAR in the fused data.

The fused data includes the motion information of the target object and the motion information of the LiDAR. Based on the motion information of the target object and the motion information of the LiDAR, a relative angular speed difference between the target object and the LiDAR is calculated, and a current angular speed can be calculated based on multiple relative angular speed differences. For example, the motion information of the target object and the motion information of the LiDAR is obtained, an average of multiple relative angular speed differences is calculated, and the average of the multiple relative angular speed differences can be used as a current relative angular speed difference. A method of calculating the average of the multiple relative angular speed differences may be calculating an arithmetic average, a geometric average, or a weighted average of the multiple relative angular speed differences. This is not limited herein.

The angular speed threshold is the minimum angular speed when attitude compensation is required. Based on a current angular speed calculated through multiple angular speeds and the preset angular speed threshold, it is determined that the current angular speed is greater than the angular speed threshold.

The fused data includes the motion information of the target object and the motion information of the LiDAR. Based on the motion information of the target object and the motion information of the LiDAR, a relative linear speed difference between the target object and the LiDAR is calculated, and a current linear speed can be calculated based on multiple relative linear speed differences. For example, the motion information of the target object and the motion information of the LiDAR is obtained, an average of multiple relative linear speed differences is calculated, and the average of multiple relative linear speed differences can be used as a current relative linear speed difference. A method of calculating the average of multiple relative linear speed differences may be calculating an arithmetic average, a geometric average, or a weighted average of the multiple relative linear speed differences. This is not limited herein.

The linear speed threshold is the minimum linear speed when attitude compensation is required. Based on a current linear speed calculated through multiple linear speeds and the preset linear speed threshold, it is determined that a current linear speed difference is greater than the linear speed threshold.

The angular speed threshold and linear speed threshold can be determined based on an actual need. When the current angular speed difference is relatively small, a collected point cloud data frame is only slightly distorted, which has little impact on the measurement result, and there is no need to perform attitude correction on the point cloud data frame. When the current linear speed difference is relatively small, a collected point cloud data frame is only slightly distorted, which has little impact on the measurement result, and there is no need to perform attitude correction on the point cloud data frame. In this application, attitude correction is performed on the point cloud data frame only when a current relative linear speed difference of the LiDAR is greater than the linear speed threshold or the current relative angular speed difference is greater than the angular speed threshold, which can reduce calculation complexity of correction.

When the current relative angular speed difference is less than or equal to the angular speed threshold, but the current relative linear speed difference may be greater than the linear speed threshold, the current relative linear speed difference is the most important factor contributing to motion distortion. In this case, the attitude compensation volume does not need to include an angular speed attitude compensation volume, and the attitude compensation volume only includes a linear speed attitude compensation volume.

When the current relative linear speed difference is less than or equal to the linear speed threshold, but the current relative angular speed difference may be greater than the angular speed threshold, the current relative angular speed difference is the most important factor contributing to motion distortion. In this case, the attitude compensation volume does not need to include a linear speed attitude compensation volume, and the attitude compensation volume only includes an angular speed attitude compensation volume.

When the current relative angular speed difference is less than or equal to the angular speed threshold and the current relative linear speed difference is less than or equal to the linear speed threshold, it indicates that a current attitude in the point cloud frame is not distorted or distortion of the current attitude may be ignored. Therefore, it can be determined that the LiDAR point cloud data obtained by the LiDAR has no motion distortion, and attitude compensation does not need to be performed on the LiDAR point cloud data.

It can be understood that, in some embodiments, the angular speed threshold and the linear speed threshold can also be adjusted based on a scenario in which the radar is located. For example, when the radar is in an environment with low scenario complexity, because there are fewer objects in the environment, relatively low detection accuracy is required, and the linear speed threshold and the angular speed threshold can be appropriately adjusted to higher values. When the radar is in an environment with relatively high scenario complexity, because there are more objects in the environment, relatively high detection accuracy is required, and the linear speed threshold and the angular speed threshold can be appropriately adjusted to lower values.

It can be understood that, in some embodiments, the angular speed threshold and the linear speed threshold can also be adjusted based on accuracy of an actual compensation result.

S306. Perform attitude compensation on the LiDAR point cloud data based on the attitude compensation volume, where the LiDAR and the millimeter-wave radar have overlapped scanning regions and the overlapped scanning regions cover the preset working region.

In some embodiments, when the fused data indicates that the target object is in motion relative to the LiDAR, the relative speed difference of the target object relative to the LiDAR is calculated based on motion information of the target object and motion information of the LiDAR in the fused data. When the relative speed difference is greater than a speed difference threshold, the attitude compensation volume of the LiDAR point cloud data is calculated based on the relative speed difference. When a current relative angular speed difference is less than or equal to an angular speed threshold and a current linear speed difference is less than or equal to a linear speed threshold, attitude compensation is not performed, thereby reducing calculation complexity of point cloud correction. When there is a motion distortion in the LiDAR point cloud data obtained by the LiDAR through scanning, attitude compensation can be performed on the LiDAR point cloud data that needs compensation, to obtain corrected LiDAR point cloud data, which improves accuracy and correct rate of LiDAR detection.

A device embodiment is provided below, and can be used to perform the method of this application. For details not disclosed in this device embodiment of this application, refer to the method embodiments of this application.

Figure 7:
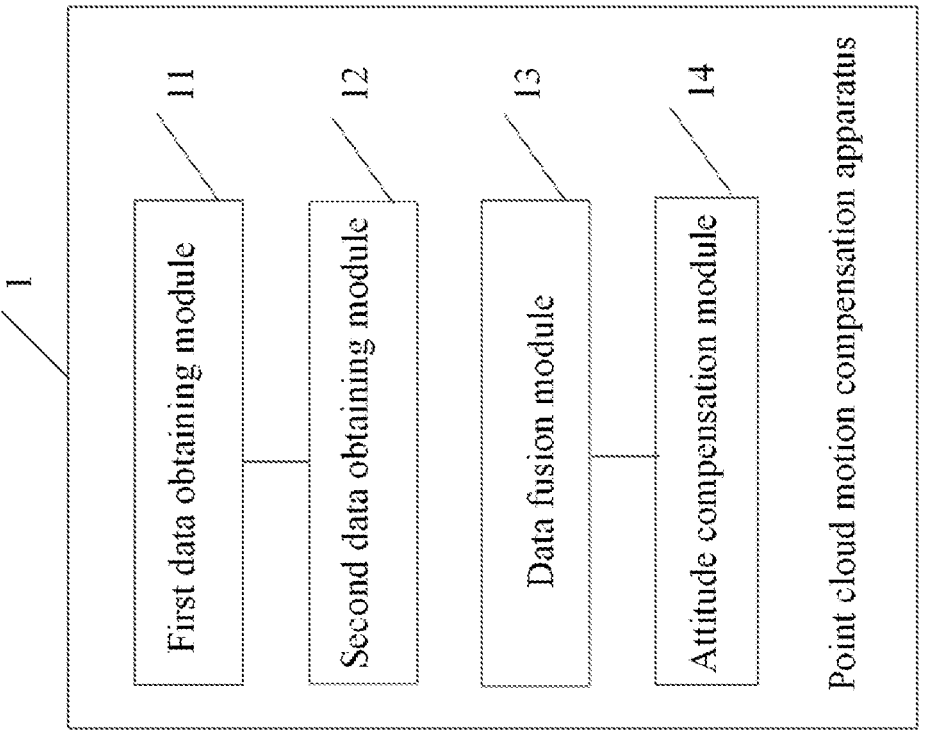
FIG. 7 is a schematic structural diagram of a point cloud motion compensation apparatus according to an embodiment of this application.

Refer to FIG. 7, which is a schematic structural diagram of a point cloud motion compensation apparatus according to an exemplary embodiment of this application. The point cloud motion compensation apparatus can be implemented as all or a part of the apparatus through software, hardware, or a combination thereof. The apparatus 1 includes a first data obtaining module 11, a second data obtaining module 12, a data fusion module 13, and an attitude compensation module 14.

The first data obtaining module 11 is configured to obtain a millimeter-wave point cloud data frame by a millimeter-wave radar through scanning a preset working region, where each millimeter-wave point cloud data frame includes multiple pieces of millimeter-wave point cloud data, and each piece of millimeter-wave point cloud data includes a timestamp and a motion parameter of a target object.

The second data obtaining module 12 is configured to obtain a LiDAR point cloud data frame by the LiDAR through scanning a preset working region, where each point cloud data frame includes multiple pieces of LiDAR point cloud data, and each piece of LiDAR point cloud data includes a timestamp and spatial position coordinates of the target object.

The data fusion module 13 is configured to fuse the millimeter-wave point cloud data with the LiDAR point cloud data to obtain fused data.

The attitude compensation module 14 is configured to perform attitude compensation on the LiDAR point cloud data based on the fused data, where the LiDAR and the millimeter-wave radar have overlapped scanning regions and the overlapped scanning regions cover the preset working region.

Figure 8:
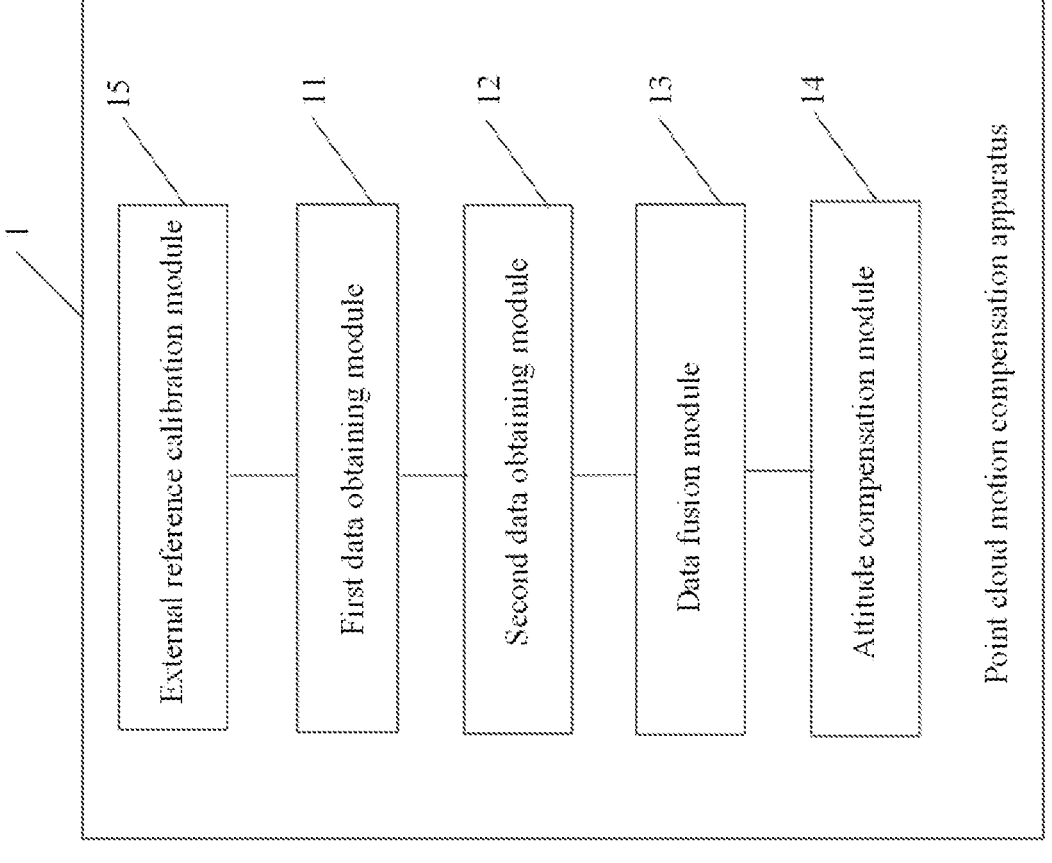
FIG. 8 is a schematic structural diagram of a point cloud motion compensation apparatus according to an embodiment of this application.

In some embodiments, as shown in FIG. 8, the apparatus 1 further includes:

an external reference calibration module 15, configured to perform external reference calibration and time synchronization on the millimeter-wave radar and the LiDAR.

Figure 9:
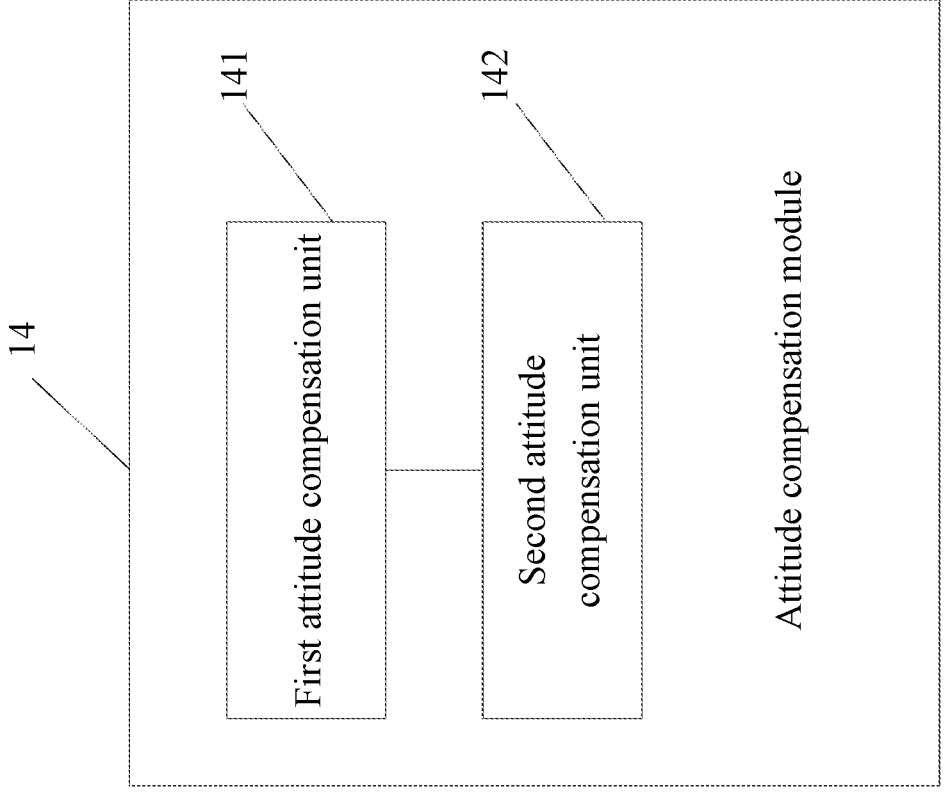
FIG. 9 is a schematic structural diagram of an attitude compensation module according to an embodiment of this application.

In some embodiments, as shown in FIG. 9, the attitude compensation module 14 includes:

a first attitude compensation unit 141, configured to: when the fused data indicates that the target object is in motion relative to the LiDAR, calculate an attitude compensation volume of the LiDAR point cloud data based on a relative speed difference of the target object relative to the LiDAR, and perform attitude compensation on the LiDAR point cloud data based on the attitude compensation volume and the spatial position coordinates of the target object; or a second attitude compensation unit 142, configured to: when the fused data indicates that the target object is in a stationary status relative to the LiDAR, skip performing attitude compensation on the LiDAR point cloud data.

Figure 10:
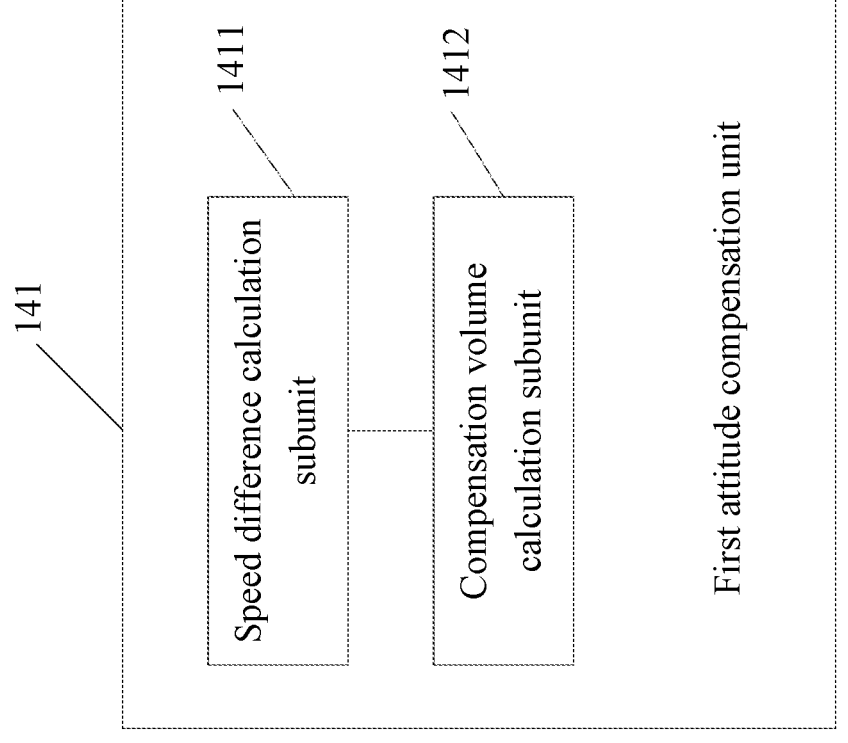
FIG. 10 is a schematic structural diagram of a first attitude compensation unit according to an embodiment of this application.

In some embodiments, as shown in FIG. 10, the first attitude compensation unit 141 includes:

a speed difference calculation subunit 1411, configured to calculate the relative speed difference of the target object relative to the LiDAR based on motion information of the target object and motion information of the LiDAR in the fused data; and a compensation volume calculation subunit 1412, configured to: when the relative speed difference is greater than a speed difference threshold, calculate the attitude compensation volume of the LiDAR point cloud data based on the relative speed difference.

In some embodiments, the compensation volume calculation subunit 1412 is configured to:

when the relative angular speed difference is less than or equal to an angular speed threshold and a current linear speed difference is greater than a linear speed threshold, the attitude compensation volume is a linear speed attitude compensation volume;

when a current relative angular speed difference is greater than an angular speed threshold and a current relative linear speed difference is less than or equal to a linear speed threshold, the attitude compensation volume is an angular speed attitude compensation volume; or when a current relative angular speed difference is less than or equal to an angular speed threshold and a current linear speed difference is less than or equal to a linear speed threshold, skip performing attitude compensation.

In some embodiments, the relative speed difference includes a relative speed difference in a horizontal direction and a relative speed difference in a vertical direction, and the first attitude compensation unit 141 includes:

a compensation volume calculation subunit 1413, configured to calculate a horizontal attitude compensation volume of the LiDAR point cloud data based on the relative speed difference of the target object relative to the LiDAR in the horizontal direction, where the compensation volume calculation subunit 1413 is configured to calculate a vertical attitude compensation volume of the LiDAR point cloud data based on the relative speed difference of the target object relative to the LiDAR in the vertical direction.

In some embodiments, the attitude compensation module 14 further includes:

a fused data clustering unit 143, configured to cluster the fused data; and a motion status determining unit 144, configured to determine a motion status of the target object relative to the LiDAR based on clustered fused data.

In some embodiments, external reference calibration and time synchronization is performed on the millimeter-wave radar and the LiDAR, so that a relative transformation relationship of a coordinate system corresponding to the LiDAR relative to a coordinate system corresponding to the millimeter-wave radar can be obtained, thereby facilitating subsequent data fusion. When the fused data indicates that the target object is in motion relative to the LiDAR, the relative speed difference of the target object relative to the LiDAR is calculated based on motion information of the target object and motion information of the LiDAR in the fused data. When the relative speed difference is greater than a speed difference threshold, the attitude compensation volume of the LiDAR point cloud data is calculated based on the relative speed difference. When a current relative angular speed difference is less than or equal to an angular speed threshold and a current linear speed difference is less than or equal to a linear speed threshold, attitude compensation is not performed, thereby reducing calculation complexity of point cloud correction. When there is a motion distortion in the LiDAR point cloud data obtained by the LiDAR through scanning, attitude compensation can be performed on the LiDAR point cloud data that needs compensation, to obtain corrected LiDAR point cloud data, which improves accuracy and correct rate of LiDAR detection.

It should be noted that, when the point cloud motion compensation apparatus performs the point cloud motion compensation method, division of the foregoing functional modules is used as an example for illustration. In actual application, the foregoing functions can be allocated to different functional modules for implementation based on practical requirements. That is, an inner structure of the device is divided into different functional modules to implement all or some of the functions described above. In addition, embodiments of the point cloud motion compensation apparatus and the point cloud motion compensation method provided above pertain to a same concept. For an exemplary implementation process, refer to the method embodiments. Details are not described herein again.

Serial numbers of the embodiments of this application are only intended for description, and do not indicate advantages or disadvantages of the embodiments.

This application also provides a computer storage medium. The computer storage medium may store a plurality of instructions. The instructions are capable of being loaded by a processor to perform the steps of the method in the embodiments shown in FIG. 2 to FIG. 6. For an exemplary execution process, refer to the description of the embodiments shown in FIG. 2 to FIG. 6. Details are not described herein again.

This application further provides a LiDAR. The LiDAR stores at least one instruction. The at least one instruction is capable of being loaded by a processor to perform the steps of the foregoing method in the embodiments shown in FIG. 2 to FIG. 6. For an exemplary execution process, refer to the description of the embodiments shown in FIG. 2 to FIG. 6. Details are not described herein again.

Figure 11:
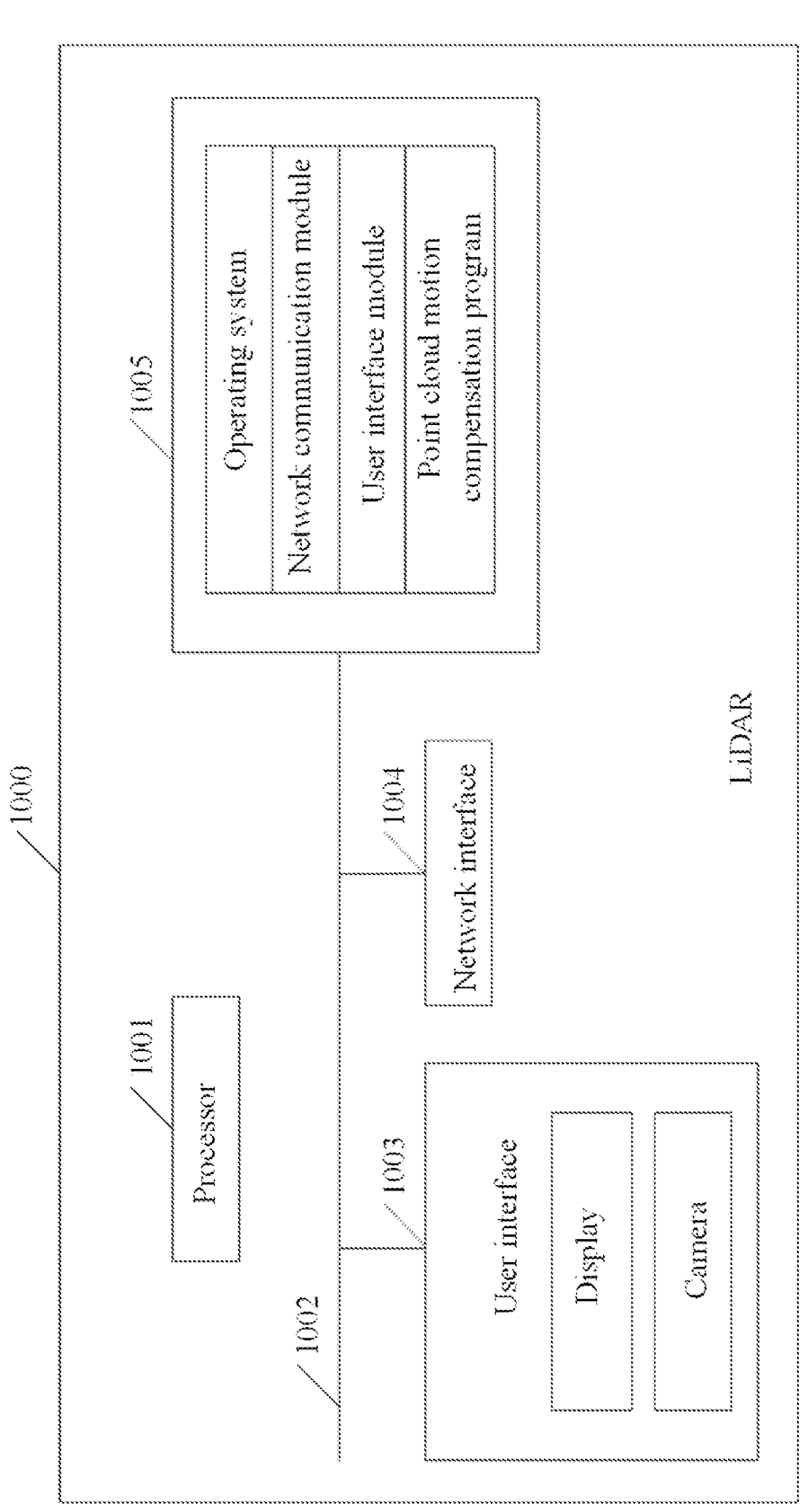
FIG. 11 is a schematic structural diagram of a LiDAR according to an embodiment of this application.

Refer to FIG. 11, which is a schematic structural diagram of an electronic device according to an embodiment of this application. As shown in FIG. 11, a mobile terminal 1000 may include: at least one processor 1001, at least one network interface 1004, a user interface 1003, a memory 1005, and at least one communication bus 1002.

Herein, the communication bus 1002 is configured to implement a connection and communication between these components.

Herein, the user interface 1003 may include a display and a camera. In some embodiments, the user interface 1003 may further include a standard wired interface and a wireless interface.

Herein, the network interface 1004 may optionally include a standard wired interface and a wireless interface (such as, a Wi-Fi interface).

Herein, the processor 1001 may include one or more processing cores. The processor 1001 uses various interfaces and lines to connect various parts of the entire electronic device 1000, and executes various functions and processes data of the electronic device 1000 by running or executing instructions, programs, code sets, or instruction sets stored in the memory 1005, and invoking data stored in the memory 1005. In some embodiments, the processor 1001 may be realized in at least one hardware form of digital signal processing (DSP), a field-programmable gate array (FPGA), or a programmable logic array (PLA). The processor 1001 may integrate a combination of one or more of a central processing unit (CPU), a graphics processing unit (GPU), a modem, or the like. The GPU is configured to render and draw content that needs to be displayed on a display. The modem is configured to process wireless communication. It may be understood that the forgoing modem may not be integrated into the processor 1001, and may be implemented by one chip independently.

The memory 1005 may include a random access memory (RAM), or a read-only memory (ROM). In some embodiments, the memory 1005 includes a non-transitory computer-readable medium. The memory 1005 may be configured to store instructions, programs, codes, code sets, or instruction sets. The memory 1005 may include a program storage region and a data storage region. The program storage region may store instructions for implementing the operating system, instructions for at least one function (such as a touch control function, a sound play function, or an image play function), and instructions for implementing each of the foregoing method embodiments. In some embodiments, the memory 1005 may also be at least one storage device distant from the forgoing processor 1001. As shown in FIG. 11, as a computer storage medium, the memory 1005 may include an operating system, a network communications module, a user interface module, and a point cloud motion compensation program.

In the mobile terminal 1000 shown in FIG. 11, the user interface 1003 is mainly configured to provide an input interface for a user to obtain data input by the user. The processor 1001 can be configured to invoke the point cloud motion compensation program stored in the memory 1005, and be configured to:

obtain a millimeter-wave point cloud data frame by a millimeter-wave radar through scanning a preset working region, where each millimeter-wave point cloud data frame includes multiple pieces of millimeter-wave point cloud data, and each piece of millimeter-wave point cloud data includes a timestamp and a motion parameter of a target object;

obtain a LiDAR point cloud data frame by the LiDAR through scanning a preset working region, where each point cloud data frame includes multiple pieces of LiDAR point cloud data, and each piece of LiDAR point cloud data includes a timestamp and spatial position coordinates of the target object;

fuse the millimeter-wave point cloud data with the LiDAR point cloud data to obtain fused data; and perform attitude compensation on the LiDAR point cloud data based on the fused data, where the LiDAR and the millimeter-wave radar have overlapped scanning regions and the overlapped scanning regions cover the preset working region.

In some embodiments, before obtaining a millimeter-wave point cloud data frame by a millimeter-wave radar through scanning a preset working region, the processor 1001 is further configured to:

perform external reference calibration and time synchronization on the millimeter-wave radar and the LiDAR.

In some embodiments, when performing attitude compensation on the LiDAR point cloud data based on the fused data, the processor 1001 is configured to:

when the fused data indicates that the target object is in motion relative to the LiDAR, calculate an attitude compensation volume of the LiDAR point cloud data based on a relative speed difference of the target object relative to the LiDAR, and perform attitude compensation on the LiDAR point cloud data based on the attitude compensation volume and the spatial position coordinates of the target object; or when the fused data indicates that the target object is in a stationary status relative to the LiDAR, skip performing attitude compensation on the LiDAR point cloud data.

In some embodiments, when the fused data indicates that the target object is in motion relative to the LiDAR, while calculating an attitude compensation volume of the LiDAR point cloud data based on a relative speed difference of the target object relative to the LiDAR, the processor 1001 is configured to:

calculate the relative speed difference of the target object relative to the LiDAR based on motion information of the target object and motion information of the LiDAR in the fused data; and when the relative speed difference is greater than a speed difference threshold, calculate the attitude compensation volume of the LiDAR point cloud data based on the relative speed difference.

In some embodiments, when the relative speed difference, which includes a relative angular speed difference and a relative linear speed difference, is greater than a speed difference threshold, while calculating the attitude compensation volume of the LiDAR point cloud data based on the relative speed difference, the processor 1001 is configured to:

when the relative angular speed difference is less than or equal to an angular speed threshold and a current linear speed difference is greater than a linear speed threshold, calculate the attitude compensation volume based on a linear speed attitude compensation volume;

when a current relative angular speed difference is greater than an angular speed threshold and a current relative linear speed difference is less than or equal to a linear speed threshold, calculate the attitude compensation volume based on an angular speed attitude compensation volume; or when a current relative angular speed difference is less than or equal to an angular speed threshold and a current linear speed difference is less than or equal to a linear speed threshold, skip performing attitude compensation.

In some embodiments, if the relative speed difference includes a relative speed difference in a horizontal direction and a relative speed difference in a vertical direction, when calculating an attitude compensation volume of the LiDAR point cloud data based on a relative speed difference of the target object relative to the LiDAR, the processor 1001 is configured to:

calculate a horizontal attitude compensation volume of the LiDAR point cloud data based on the relative speed difference of the target object relative to the LiDAR in the horizontal direction; and calculate a vertical attitude compensation volume of the LiDAR point cloud data based on the relative speed difference of the target object relative to the LiDAR in the vertical direction.

In some embodiments, before performing attitude compensation on the LiDAR point cloud data, the processor 1001 is further configured to:

cluster the fused data; and determine a motion status of the target object relative to the LiDAR based on clustered fused data.

In some embodiments, external reference calibration and time synchronization is performed on the millimeter-wave radar and the LiDAR, so that the relative transformation relationship between the coordinate system corresponding to the LiDAR and the coordinate system corresponding to the millimeter-wave radar can be obtained, thereby facilitating subsequent data fusion. When the fused data indicates that the target object is in motion relative to the LiDAR, the relative speed difference of the target object relative to the LiDAR is calculated based on motion information of the target object and motion information of the LiDAR in the fused data. When the relative speed difference is greater than a speed difference threshold, the attitude compensation volume of the LiDAR point cloud data is calculated based on the relative speed difference. When a current relative angular speed difference is less than or equal to an angular speed threshold and a current linear speed difference is less than or equal to a linear speed threshold, attitude compensation is not performed, thereby reducing calculation complexity of point cloud correction. When there is a motion distortion in the LiDAR point cloud data obtained by the LiDAR through scanning, attitude compensation can be performed on the LiDAR point cloud data that needs compensation, to obtain corrected LiDAR point cloud data, which improves accuracy and a correct rate of LiDAR detection results.

The person skilled in the art can understand that all or part of procedures in methods of the forgoing embodiments can be implemented by instructing relevant hardware via computer program. The program can be stored in a computer readable storage medium. During execution, the computer program can include the procedures of the embodiments of the forgoing methods. A storage medium can be a magnetic disk, an optical disc, a read-only storage memory, or a random storage memory, and so on.

The disclosed forgoing are only exemplary embodiments of the present application, which cannot be used to limit the scope of the present application. Therefore, equivalent changes made in accordance with the claims of the present application still fall within the scope of the application.

What is claimed is:

1. A point cloud motion compensation method, applied to a LiDAR, wherein the method comprises:

obtaining a millimeter-wave point cloud data frame by a millimeter-wave radar through scanning a preset working region, wherein the millimeter-wave point cloud data frame comprises multiple pieces of millimeter-wave point cloud data, and each piece of the millimeter-wave point cloud data comprises a timestamp and a motion parameter of a target object;

obtaining a LiDAR point cloud data frame by the LiDAR through scanning a preset working region, wherein the point cloud data frame comprises multiple pieces of LiDAR point cloud data, and each piece of the LiDAR point cloud data comprises a timestamp and spatial position coordinates of the target object;

fusing the millimeter-wave point cloud data with the LiDAR point cloud data to obtain fused data; and performing attitude compensation on the LiDAR point cloud data based on the fused data, wherein the LiDAR and the millimeter-wave radar have overlapped scanning regions and the overlapped scanning regions cover the preset working region, wherein performing the attitude compensation on the LiDAR point cloud data based on the fused data comprises:

when the fused data indicates that the target object is in motion relative to the LiDAR, calculating an attitude compensation volume of the LiDAR point cloud data based on a relative speed difference of the target object relative to the LiDAR, and performing attitude compensation on the LiDAR point cloud data based on the attitude compensation volume and the spatial position coordinates of the target object; or when the fused data indicates that the target object is in a stationary status relative to the LiDAR, skipping performing attitude compensation on the LiDAR point cloud data.

2. The point cloud motion compensation method according to claim 1, wherein before obtaining a millimeter-wave point cloud data frame by a millimeter-wave radar through scanning a preset working region, the method further comprises:

performing external reference calibration and time synchronization on the millimeter-wave radar and the LiDAR.

3. The point cloud motion compensation method according to claim 1, wherein when the fused data indicates that the target object is in motion relative to the LiDAR, calculating an attitude compensation volume of the LiDAR point cloud data based on a relative speed difference of the target object relative to the LiDAR comprises:

calculating the relative speed difference of the target object relative to the LiDAR based on motion information of the target object and motion information of the LiDAR in the fused data; and when the relative speed difference is greater than a speed difference threshold, calculating the attitude compensation volume of the LiDAR point cloud data based on the relative speed difference.

4. The point cloud motion compensation method according to claim 3, wherein the relative speed difference comprises a relative angular speed difference and a relative linear speed difference, and when the relative speed difference is greater than a speed difference threshold, calculating the attitude compensation volume of the LiDAR point cloud data based on the relative speed difference comprises at least one of the following:

when the relative angular speed difference is less than or equal to an angular speed threshold and a current linear speed difference is greater than a linear speed threshold, calculating the attitude compensation volume of the LiDAR point cloud data based on the current linear speed difference;

when a current relative angular speed difference is greater than an angular speed threshold and a current relative linear speed difference is less than or equal to a linear speed threshold, calculating the attitude compensation volume of the LiDAR point cloud data based on the current relative angular speed difference; or when a current relative angular speed difference is less than or equal to an angular speed threshold and a current linear speed difference is less than or equal to a linear speed threshold, skipping performing attitude compensation.

5. The point cloud motion compensation method according to claim 1, wherein the relative speed difference comprises a relative speed difference in a horizontal direction and a relative speed difference in a vertical direction, and calculating an attitude compensation volume of the LiDAR point cloud data based on a relative speed difference of the target object relative to the LiDAR comprises:

calculating a horizontal attitude compensation volume of the LiDAR point cloud data based on the relative speed difference of the target object relative to the LiDAR in the horizontal direction; and calculating a vertical attitude compensation volume of the LiDAR point cloud data based on the relative speed difference of the target object relative to the LiDAR in the vertical direction.

6. The point cloud motion compensation method according to claim 1, wherein before performing attitude compensation on the LiDAR point cloud data, the method further comprises:

clustering the fused data; and determining a motion status of the target object relative to the LiDAR based on clustered fused data.

7. A point cloud motion compensation apparatus, applied to a LiDAR, wherein the apparatus comprises:

a first data obtaining module, configured to obtain a millimeter-wave point cloud data frame by a millimeter-wave radar through scanning a preset working region, wherein the millimeter-wave point cloud data frame comprises multiple pieces of millimeter-wave point cloud data, and each piece of the millimeter-wave point cloud data comprises a timestamp and a motion parameter of a target object;

a second data obtaining module, configured to obtain a LiDAR point cloud data frame by the LiDAR through scanning a preset working region, wherein the point cloud data frame comprises multiple pieces of LiDAR point cloud data, and each piece of the LiDAR point cloud data comprises a timestamp and spatial position coordinates of the target object;

a data fusion module, configured to fuse the millimeter-wave point cloud data with the LiDAR point cloud data to obtain fused data; and an attitude compensation module, configured to perform attitude compensation on the LiDAR point cloud data based on the fused data, wherein the LiDAR and the millimeter-wave radar have overlapped scanning regions and the overlapped scanning regions cover the preset working region, wherein performing the attitude compensation on the LiDAR point cloud data based on the fused data comprises:

when the fused data indicates that the target object is in motion relative to the LiDAR, calculating an attitude compensation volume of the LiDAR point cloud data based on a relative speed difference of the target object relative to the LiDAR, and performing attitude compensation on the LiDAR point cloud data based on the attitude compensation volume and the spatial position coordinates of the target object; or when the fused data indicates that the target object is in a stationary status relative to the LiDAR, skipping performing attitude compensation on the LiDAR point cloud data.

8. A non-transitory computer readable storage medium storing a plurality of instructions, wherein the instructions are capable of being loaded by a processor to perform steps of the method according to claim 1.

\*　\*　\*　\*　\*